(12) United States Patent
Michibata

(10) Patent No.: US 9,791,831 B2
(45) Date of Patent: Oct. 17, 2017

(54) IMAGE FORMING APPARATUS

(71) Applicant: Konica Minolta, Inc., Chiyoda-ku, Tokyo (JP)

(72) Inventor: Takumi Michibata, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/259,097

(22) Filed: Sep. 8, 2016

(65) Prior Publication Data

US 2017/0075301 A1     Mar. 16, 2017

(30) Foreign Application Priority Data

Sep. 15, 2015 (JP) .................................. 2015-181333

(51) Int. Cl.
*G03G 21/20* (2006.01)
*B60H 1/00* (2006.01)

(52) U.S. Cl.
CPC . *G03G 21/206* (2013.01); *B60H 2001/00635* (2013.01); *G03G 2221/1645* (2013.01)

(58) Field of Classification Search
CPC ......... G03G 21/206; G03G 2221/1645; B60H 2001/00635
USPC .......................... 277/533, 543, 546, 547, 632
See application file for complete search history.

(56) References Cited

U.S. PATENT DOCUMENTS

| 1,397,334 | A | * | 11/1921 | Schmolinski | ............... F16J 9/20 277/434 |
| 1,930,857 | A | * | 10/1933 | Morton | ...................... B23C 3/22 29/888.076 |
| 4,189,161 | A | * | 2/1980 | Grimm | ....................... F16J 9/14 277/496 |
| 4,575,107 | A | * | 3/1986 | Umegawa | ................... F16J 9/00 277/499 |
| 5,253,878 | A | * | 10/1993 | Miura | ......................... F16J 9/14 277/499 |
| 5,660,398 | A | * | 8/1997 | Terao | ......................... F16J 9/14 277/581 |
| 5,779,243 | A | * | 7/1998 | Hanlon | ...................... F16J 9/26 277/434 |

(Continued)

FOREIGN PATENT DOCUMENTS

| JP | 7-92862 A | 4/1995 |
| JP | 2004217103 A | * 8/2004 |

(Continued)

*Primary Examiner* — Ryan Walsh
(74) *Attorney, Agent, or Firm* — Buchanan Ingersoll & Rooney PC

(57) ABSTRACT

An image forming apparatus includes: an exhaust fan which has a pipe portion; and a duct. One of the pipe portion and the exhaust duct is inserted and fitted into the other such that they are connected to each other. A band-shaped seal member is attached to the entire outer circumference of the pipe portion. Both end portions of the seal member overlap each other in the circumferential direction of the pipe portion and are located a predetermined gap apart in an axial direction. The end portion of the seal member on the side of connection of the pipe portion has a non-fixed portion which is extended a predetermined length from a tip end in the circumferential direction and which is not fixed to the pipe portion, to reliably prevent an air leakage from a connection portion in a fan and a duct.

5 Claims, 6 Drawing Sheets

(56) References Cited

U.S. PATENT DOCUMENTS

| | | | | |
|---|---|---|---|---|
| 7,175,387 B2 * | 2/2007 | Kreis | ................... | F01D 5/22 |
| | | | | 277/628 |
| 2009/0200756 A1 * | 8/2009 | Yamamoto | ......... | B60H 1/00571 |
| | | | | 277/616 |
| 2013/0266337 A1 * | 10/2013 | Leemhuis | ............ | G03G 21/206 |
| | | | | 399/92 |
| 2015/0115542 A1 * | 4/2015 | Neumann | ................ | F16J 9/14 |
| | | | | 277/546 |
| 2016/0195848 A1 * | 7/2016 | Sasaki | ................... | F24F 7/065 |
| | | | | 399/92 |

FOREIGN PATENT DOCUMENTS

| | | | |
|---|---|---|---|
| JP | 2006-208842 A | | 8/2006 |
| JP | 2008308000 A | * | 12/2008 |

\* cited by examiner

INSERTION DIRECTION

IMAGE FORMING APPARATUS

This application is based on Japanese Patent Application No. 2015-181333 filed on Sep. 15, 2015, the contents of which are hereby incorporated by reference.

BACKGROUND OF THE INVENTION

Field of the Invention

The present invention relates to an image forming apparatus, and more particularly relates to an image forming apparatus that includes a fan which has a pipe portion serving as an inlet/outlet gas path and a duct to which a plurality of pipe members are connected.

Description of the Related Art

In an electrophotographic image forming apparatus such as a copying machine, a facsimile machine or a printer regardless of whether it is a color type or a monochrome type, a toner is supplied from a development device to an electrostatic latent image on a photosensitive member, development is performed, a toner image developed is transferred to a sheet or the like and thereafter the toner image is heated and pressurized with a fixing device and is thereby fused and fixed to the sheet.

In recent years, even such an image forming apparatus has been required to have excellent environmental performance for realizing a comfortable office environment. Although a filter for capturing floating substances produced within an apparatus is conventionally provided, various discharge regulations are strictly prescribed by international standards due to a keen interest in the environmental performance, with the result that it is difficult to cope with such conditions with the conventional filter performance. In particular, in Europe and the like, it is required to rapidly cope with the effective removal of VOCs (Volatile Organic Compounds), UFPs (Ultrafine Particles) and the like such as toluene, styrene and siloxane substances produced from a pressure roller and the like used in the fixing device.

Japanese Unexamined Patent Application Publication No. 2006-208842 proposes a technology which blocks, with a seal plate, a gap between a fan and a duct to prevent an exhaust leakage. Japanese Unexamined Patent Application Publication No. 7-92862 proposes an exhaust device which elastically holds an ozone filter within a duct by the elasticity of a seal member.

However, the gap cannot be completely removed by the blocking of the gap with the seal plate disclosed in Japanese Unexamined Patent Application Publication No. 2006-208842, ultrafine particles such as UFPs leak, and thus it may be impossible to achieve excellent environmental performance. In the exhaust device disclosed in Japanese Unexamined Patent Application Publication No. 7-92862, since the seal member is adhered to the outer circumference of the ozone filter, for example, as shown in FIG. 8A, a minute gap may be produced in the joint of both end portions of the seal member such by variations in the dimensional accuracy of the seal member and the adherence thereof. Moreover, as shown in FIG. 8B, one end portion of the seal member overlaps the other end portion to form a laminate portion, and thus variations in the elastic deformation of the seal member are produced when the pipe member is connected, with the result that the hermeticity of a connection portion may be lowered.

The present invention is made in view of the conventional problem described above, and an object thereof is to provide an image forming apparatus which reliably prevents an air leakage from a connection portion in a fan and a duct without being affected by variations in the dimensional accuracy of the seal member and the adherence thereof and which can efficiently transport air to a filter or the like.

SUMMARY OF THE INVENTION

In order to achieve the above object, an image forming apparatus according to the present invention includes: a fan which has a pipe portion serving as an inlet/outlet gas path; and a duct to which a plurality of pipe members are connected, where one of the pipe portion and the pipe member and/or one of the pipe members is inserted and fitted into the other such that the one and the other are connected to each other, a band-shaped seal member is attached to the entire outer circumference of the one or the entire inner circumference of the other, both end portions of the seal member overlap each other in the circumferential direction of the pipe portion or the pipe member and are located a predetermined gap apart in an axial direction and the end portion of the seal member on the side of connection of the pipe portion or the pipe member has a non-fixed portion which is extended a predetermined length from a tip end in the circumferential direction and which is not fixed to the pipe portion or the pipe member.

In the configuration described above, in a region where the both end portions of the seal member overlap each other in the circumferential direction of the pipe portion or the pipe member, a tip end portion may be narrower in width than a root portion.

In the configuration described above, in the region where the both end portions of the seal member overlap each other in the circumferential direction of the pipe portion or the pipe member, the width may be narrower toward the tip end either continuously or stepwise.

In the configuration described above, the non-fixed portion of the seal member is preferably the whole or part of the region where the both end portions of the seal member overlap each other in the circumferential direction.

In the configuration described above, the length of the non-fixed portion from the tip end is preferably longer than the gap between the both end portions of the seal member in the axial direction.

DESCRIPTION OF PREFERRED EMBODIMENTS

An image forming apparatus according to the present invention will be described below with reference to drawings. The present invention is not limited to these embodiments at all.

Figure 1:
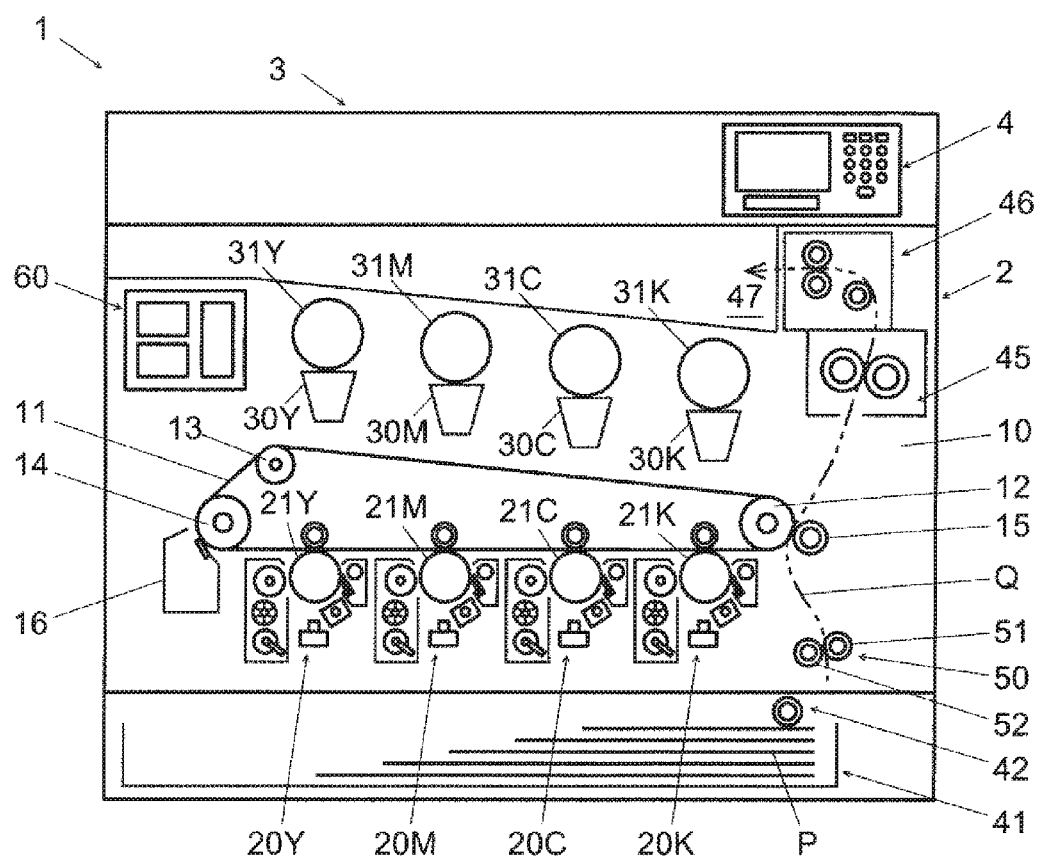
[FIG. 1] A schematic partial vertical cross-sectional front view of an image forming apparatus according to an embodiment of the present invention.

An image output operation will first be described while the schematic structure of the image forming apparatus according to the present invention is being described with reference to FIG. 1. FIG. 1 is an example of a schematic partial vertical cross-sectional front view of the image forming apparatus. A two-dot chain line with an arrow in the figure indicates the transport route and the transport direction of a sheet.

The image forming apparatus 1 is a so-called tandem-type color copying machine as shown in FIG. 1, and includes an image reader portion 3 which reads an image of an original document, a print portion 2 which prints the read image on a transfer member such as a sheet and an operation display portion 4 for inputting print conditions and displaying an operational status.

The image reader portion 3 is a known one that reads the image of the original document placed on a platen glass (not shown) by moving a scanner. The image of the original document is divided into three colors of red (R), green (G) and blue (B), and they are converted with a CCD (Charge Coupled Device) image sensor (not shown) into electrical signals. In this way, the image reader portion 3 obtains image data on the individual colors of red (R), green (G) and blue (B).

A control portion 60 performs various types of processing on the image data on the individual colors obtained by the image reader portion 3, the image data is converted into image data on the individual reproduction colors of yellow (Y), magenta (M), cyan (C) and black (K) and the image data is stored in a memory (not shown) within the control portion 60. The image data on the individual reproduction colors stored in the memory is subjected to processing for displacement correction, and is thereafter read per scanning line in synchronization with the transport of the sheet so that light scanning is performed on a photosensitive drum 21 serving as an image carrying member.

The print portion 2 forms an image with an electrophotographic system, and transfers the image to the sheet or the like. The print portion 2 includes an intermediate transfer belt 11 in which an intermediate transfer member is formed as an endless belt. The intermediate transfer belt 11 is wound on a drive roller 12, a tension roller 13 and a driven roller 14. The tension roller 13 receives a force acting upward in FIG. 1 exerted by a spring (not shown), and thus a tension is applied to the intermediate transfer belt 11. The intermediate transfer belt 11 is moved to rotate counterclockwise in FIG. 1 by the drive roller 12.

The drive roller 12 is pressed onto a secondary transfer roller 15 which is opposite the drive roller 12 through the intermediate transfer belt 11. In the place of the driven roller 14, an intermediate transfer cleaning portion 16 which is provided opposite the driven roller 14 through the intermediate transfer belt 11 is brought into contact with the outer circumferential surface of the intermediate transfer belt 11. The intermediate transfer cleaning portion 16 performs cleaning by scraping the toner left on the outer circumferential surface of the intermediate transfer belt 11 after secondary transfer.

Below the intermediate transfer belt 11, image formation portions 20Y, 20M, 20C and 20K corresponding to the individual reproduction colors of yellow (Y), magenta (M), cyan (C) and black (K) are provided. In the following description, unless it is necessary to particularly provide a limitation, the identification symbols of "Y", "M", "C" and "K" are omitted, and for example, they may be collectively referred to as "image formation portions 20". The four image formation portions 20 are arranged in line from the upstream side to the downstream side in the rotation direction along the rotation direction of the intermediate transfer belt 11. The configurations of the four image formation portions 20 are the same as each other, and the image formation portion 20 includes, therearound, a charging portion, an exposure portion, a development portion, a cleaning portion and a primary transfer roller with the photosensitive drum 21 rotated clockwise in FIG. 1 in the center thereof.

Above the intermediate transfer belt 11, toner bottles 31 and toner hoppers 30 corresponding to the four image formation portions 20 of the individual reproduction colors are provided. When a remaining amount detection portion (not shown) detects that the amount of toner within the development portion is lowered, a supply device (not shown) is driven such that the toner is supplied from the toner hopper 30 to the development device. Furthermore, when the remaining amount detection portion (not shown) detects that the amount of toner within the toner hopper 30 is lowered, the supply device (not shown) is driven such that the toner is supplied from the toner bottle 31 to the toner hopper 30. The toner bottle 31 is removable with respect to an apparatus main body 10, and the toner bottle 31 can be replaced with a new one as necessary.

Below the four image formation portions 20, a sheet supply device 41 is provided, and sheets P are stored therewithin. The sheets P stored within the sheet supply device 41 are fed by a supply portion 42 sequentially from the uppermost layer thereof to a sheet transport path Q. The sheet P fed from the sheet supply device 41 to the sheet transport path Q reaches the place of a sheet transport device 50 which has registration rollers 51 and 52. Then, in synchronization with the rotation of the intermediate transfer belt 11, the registration rollers 51 and 52 feed out the sheet P to a contact portion (secondary transfer nip portion) between the intermediate transfer belt 11 and the secondary transfer roller 15.

In the image formation portion 20, an electrostatic latent image is formed on the surface of the photosensitive drum 21 with the charging portion and the exposure portion, and the electrostatic latent image is visualized as the toner image with the development portion. The toner image formed on the surface of the photosensitive drum 21 is primarily transferred to the outer circumferential surface of the intermediate transfer belt 11 in a place where the photosensitive drum 21 is opposite the primary transfer roller through the intermediate transfer belt 11. Then, as the intermediate transfer belt 11 is rotated, the toner images of the image formation portions 20 are sequentially transferred to the intermediate transfer belt 11 with predetermined timing, and thus a color toner image in which the toner images of the four colors of yellow, magenta, cyan and black are overlapped is formed on the outer circumferential surface of the intermediate transfer belt 11.

The color toner image primarily transferred to the outer circumferential surface of the intermediate transfer belt 11 is transferred to the sheet P fed by the sheet transport device 50 in synchronization therewith in the secondary transfer nip portion formed by bringing the intermediate transfer belt 11 into contact with the secondary transfer roller 15.

Above the secondary transfer nip portion, a fixing device 45 is provided. The sheet P to which an unfixed toner image is transferred in the secondary transfer nip portion is fed to the fixing device 45, and is sandwiched between a heating roller and a pressure roller, and the toner image is heated and fused so as to be fixed to the sheet P. The sheet P on which the fixing processing has been performed is ejected through a paper ejection device 46 to a paper ejection tray 27.

Figure 2:
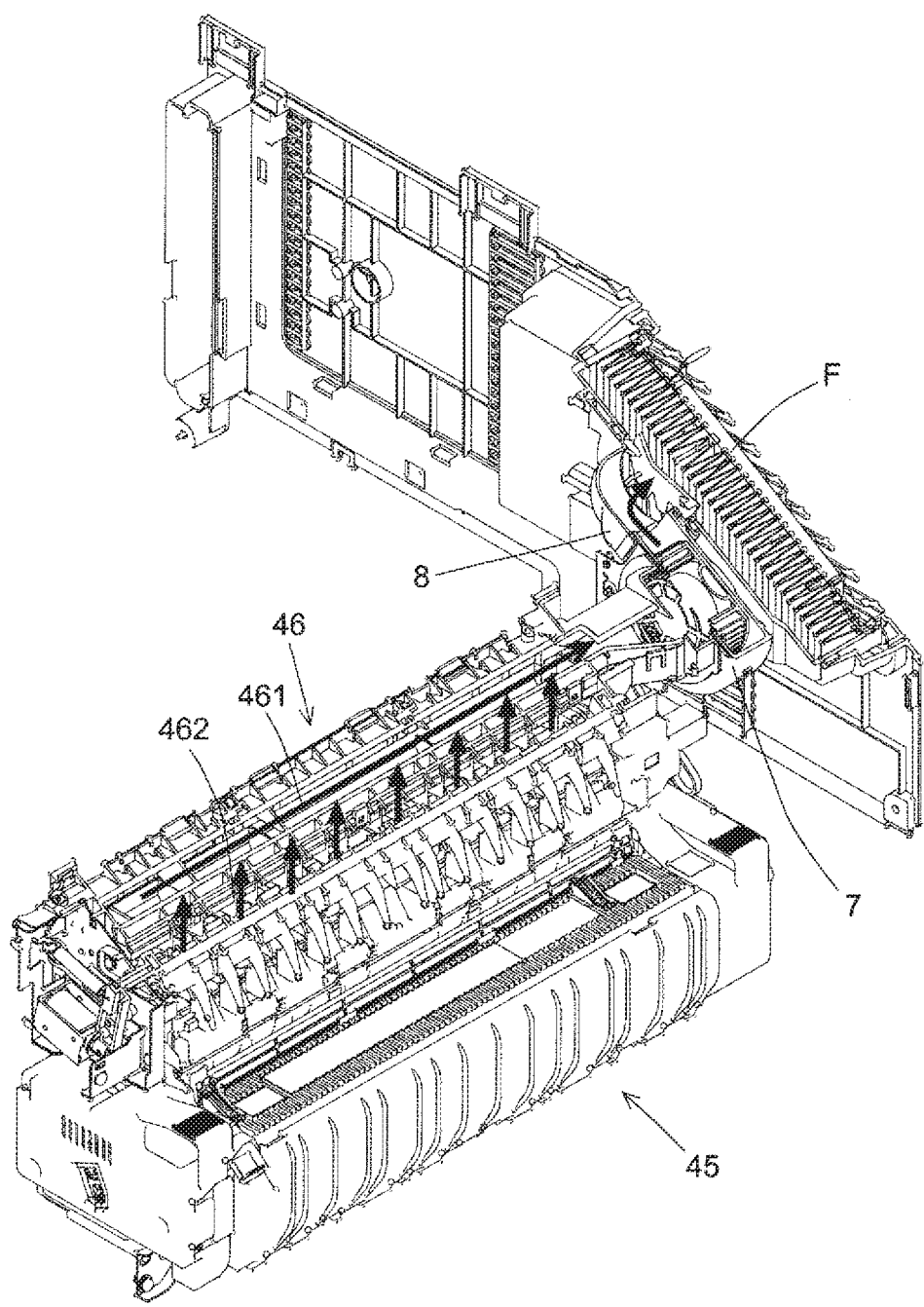
[FIG. 2] A perspective view showing a flow path along which air is passed from a fixing device to an exhaust fan.

FIG. 2 is a diagram of the configuration of the fixing device 45, the paper ejection device 46 and an exhaust fan 7. Above the fixing device 45, the paper ejection device 46 is located, and the exhaust fan 7 is located on the side of the back surface of the apparatus main body 10 with respect to the paper ejection device 46. One end of an exhaust duct 8 is connected to a pipe portion 71 serving as the outlet gas path of the exhaust fan 7 (see FIGS. 3A and 3B), the other end of the exhaust duct 8 is connected to an outlet in which an electrostatic filter F is stored.

Within the paper ejection device 46, a ventilation path 461 which is extended long along the direction of the width of the sheet is provided, and opening portions 462 directed to the sheet transport path Q (which is shown in FIG. 1) are provided partway through the ventilation path 461 at a plurality of places. An end portion of the ventilation path 461 is connected to the inlet of the exhaust fan 7.

When the exhaust fan 7 is driven, an air flow (air suction) which travels from the sheet transport path Q through the opening portions 462 and the ventilation path 461 to the exhaust fan 7 is produced. By the air suction described above, volatile VOCs, UFPs and the like such as toluene, styrene and siloxane substances produced in the fixing device 45 are sucked, and the sheet P which is heated by the fixing device 45 is also cooled.

The air sucked by the exhaust fan 7 is passed through the exhaust duct 8 and is fed to the electrostatic filter F. Then, after VOCs and UFPs within the air are removed with the electrostatic filter F, the air is discharged to the outside of the apparatus main body 10.

Figure 3A:
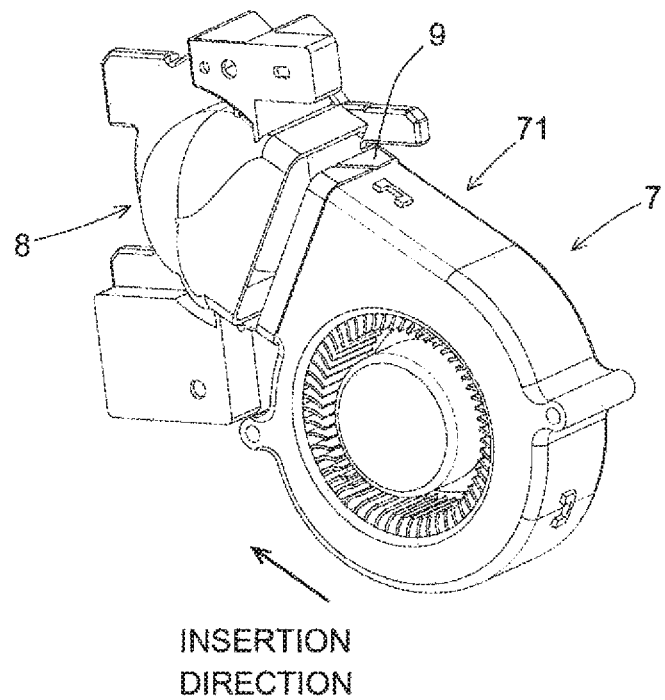
[FIG. 3A] A perspective view illustrating a state before the connection of the exhaust fan and an air duct.
Figure 3B:
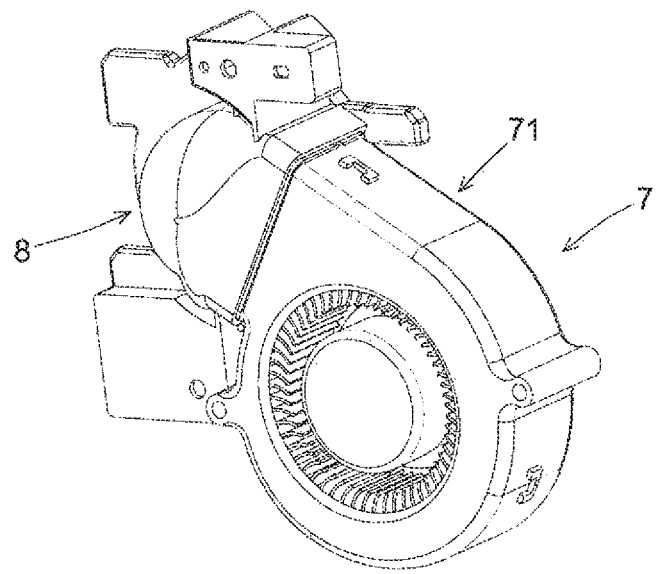
[FIG. 3B] A perspective view illustrating a state after the connection of the exhaust fan and the air duct.
Figure 4:
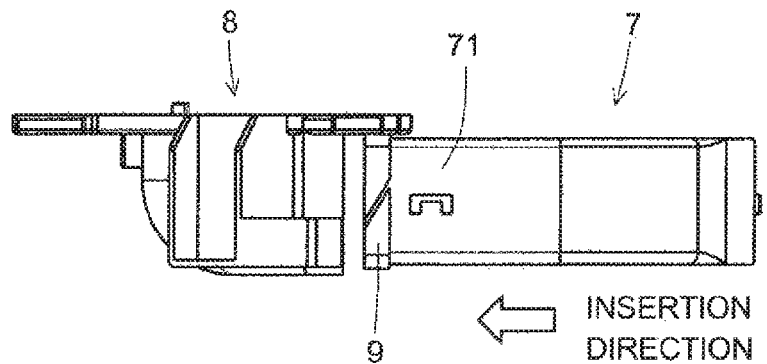
[FIG. 4] A top view before the connection of the pipe portion of the exhaust fan and an exhaust duct.

The structure of the connection between the pipe portion 71 and the exhaust duct 8 in the exhaust fan 7 is shown in FIGS. 3A, 3B and 4. FIG. 3A is a diagram of a state before the connection, and FIG. 3B is a diagram of a state after the connection. FIG. 4 is a top view before the connection of the pipe portion 71 and the exhaust duct 8 in the exhaust fan 7. As shown in FIGS. 3A and 4, a band-shaped seal member 9 is adhered to the entire outer circumference of the insertion port of the pipe portion 71 in the exhaust fan 7. The shape of the end portion of the seal member 9 and the state where the seal member 9 is adhered will be described later. On the other hand, the reception port of the exhaust duct 8 has a similar shape to the insertion port of the pipe portion 71 in the exhaust fan 7, and is larger than the insertion port of the pipe portion 71 but is smaller than the outer circumference of a portion of the pipe portion 71 to which the seal member 9 is adhered.

As the seal member 9, a conventional known member can be used as long as it can be elastically deformed and has hermeticity. For example, urethane foam or moltopren (polyester-based polyurethane foam) can be suitably used.

The connection between the exhaust fan 7 and the exhaust duct 8 is performed by inserting the insertion port of the pipe portion 71 in the exhaust fan 7 into the reception port of the exhaust duct 8. When the insertion port of the pipe portion 71 is inserted into the reception port of the exhaust duct 8, since a gap between the insertion port and the reception port is narrower than the thickness of the seal member 9, the seal member 9 is pressed and crushed between the insertion port and the reception port to fill the gap between the insertion port and the reception port. In this way, air is prevented from leaking from a connection portion.

Figures 5A, 5B:
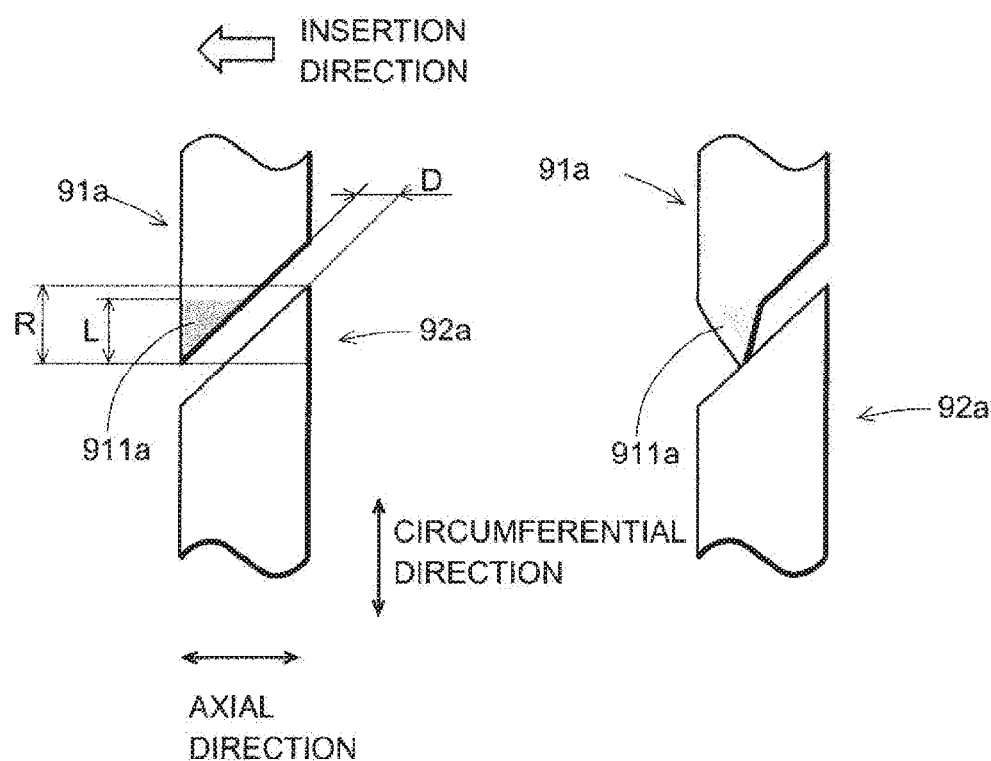
[FIG. 5A] An enlarged view illustrating a state before the connection of both end portions of a seal member shown in FIG. 4.
[FIG. 5B] An enlarged view illustrating a state after the connection of the both end portions of the seal member shown in FIG. 4.

The shape of the end portion of the seal member 9 and the state where the seal member 9 is adhered will then be described. FIGS. 5A and 5B are enlarged plan views of both end portions 91*a* and 92*a* of the seal member 9 which is adhered to the entire outer circumference of the pipe portion 71 in the exhaust fan 7. FIG. 5A is a diagram of a state before the connection, and FIG. 5B is a diagram of a state after the connection. The both end portions 91*a* and 92*a* of the band-shaped seal member 9 have end sides which have a predetermined angle with respect to an axial direction and which are parallel to each other, and the end sides are located a gap D apart in the axial direction and overlap each other in a circumferential direction. Specifically, the shape of a region R where the both end portions 91*a* and 92*a* of the seal member 9 overlap each other in the axial direction is a shape (triangular shape) in which its width is continuously decreased as the shape is extended from its root portion to its tip end.

Although the seal member 9 is attached to the pipe portion 71 with a conventional known adhesive member such as an adhesive or a double-sided tape, a non-fixed portion 911*a* which is extended a length L from its tip end and which is not adhered to the pipe portion 71 is formed in the region R.

As shown in FIG. 5B, when the insertion port of the exhaust fan 7 is inserted into the reception port of the exhaust duct 8, the non-fixed portion 911*a* of the end portion 91*a* of the seal member 9 is elastically deformed by a pressing force caused by the inner circumferential surface of the reception port to make contact with the other end portion 92*a* of the seal member 9 and thereby block the gap D between the both end portions. In this way, the hermeticity of the connection portion is acquired. The non-fixed portion 911*a* described above is provided, and thus it is possible to reliably prevent an air leakage from a connection portion in a fan and a duct without being affected by variations in the dimensional accuracy of the seal member 9 and the adherence thereof.

Here, the non-fixed portion 911*a* is preferably the whole or part of the region R where the both end portions 91*a* and 92*a* of the seal member 9 overlap each other in the circumferential direction. This is because the unnecessary deformation of the seal member 9 at the time of the connection is reduced and thus the occurrence of a wrinkle and a damage in the seal member 9 is reduced.

The length L of the non-fixed portion 911*a* from the tip end is preferably longer than the gap D between the both end portions of the seal member 9. In this way, it is possible to reliably block, with the non-fixed portion 911*a,* the gap D between the both end portions of the seal member 9.

Although the ratio of the length L of the non-fixed portion 911a from the tip end to the gap D between the both end portions of the seal member 9 can be determined as necessary according to the width, the material and the like of the seal member 9, in general, L/D preferably falls within a range of 1.0 to 5.0.

Figure 6A:
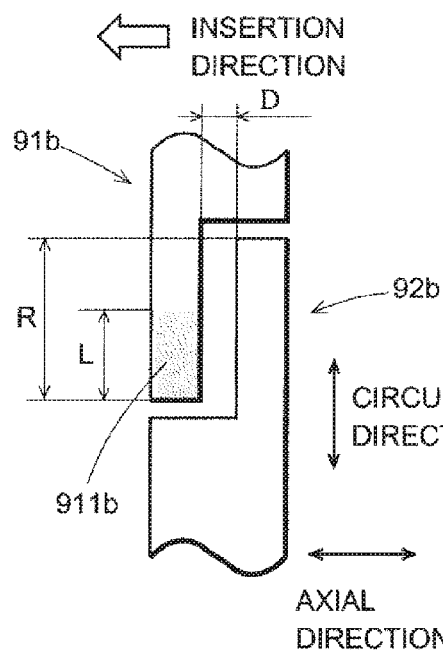
[FIG. 6A] An enlarged view illustrating a state before the connection of the both end portions of the seal member in another embodiment.
Figure 6B:
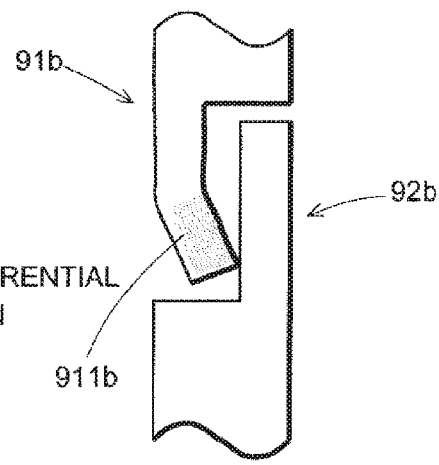
[FIG. 6B] An enlarged view illustrating a state after the connection of the both end portions of the seal member in the another embodiment.

FIGS. 6A and 6B show another embodiment of the both end portions of the seal member 9. The both end portions 91b and 92b of the seal member 9 shown in FIGS. 6A and 6B have a shape in which the width is once decreased from the root portion to the tip end, the projection and the recess of the both end portions 91b and 92b are located so as to fit each other with a predetermined distance apart. In a region R where the both end portions 91b and 92b of the seal member 9 overlap each other in the circumferential direction, a non-fixed portion 911b which is extended a length L from the tip end of the end portion 91b on the side of the connection portion and which is not adhered to the pipe portion 71 is formed.

In the seal member 9 configured as described above, when the insertion port of the exhaust fan 7 is inserted into the reception port of the exhaust duct 8, as shown in FIG. 6B, the non-fixed portion 911b of the end portion 91b of the seal member 9 is elastically deformed by a pressing force caused by the inner circumferential surface of the reception port to make contact with the other end portion 92b of the seal member 9 and thereby block the gap D between the both end portions. In this way, as in the embodiment shown in FIGS. 5A and 5B, the hermeticity of the connection portion is acquired. As in the embodiment described above, the non-fixed portion 911b is preferably the whole or part of the region R where the both end portions 91b and 92b of the seal member 9 overlap each other in the circumferential direction. Although the both end portions 91b and 92b of the seal member 9 shown in FIGS. 6A and 6B have the shape in which the width is once decreased, they may have a shape in which the width is decreased in multiple stages.

Figure 7A:
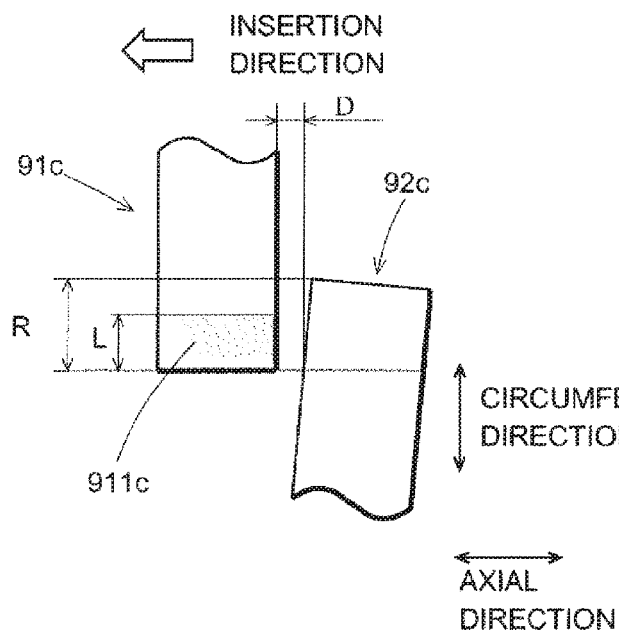
[FIG. 7A] An enlarged view illustrating a state before the connection of the both end portions of the seal member in yet another embodiment.
Figure 7B:
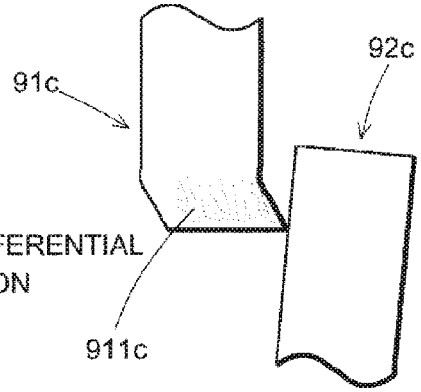
[FIG. 7B] An enlarged view illustrating a state after the connection of the both end portions of the seal member in the yet another embodiment.
Figure 8A:
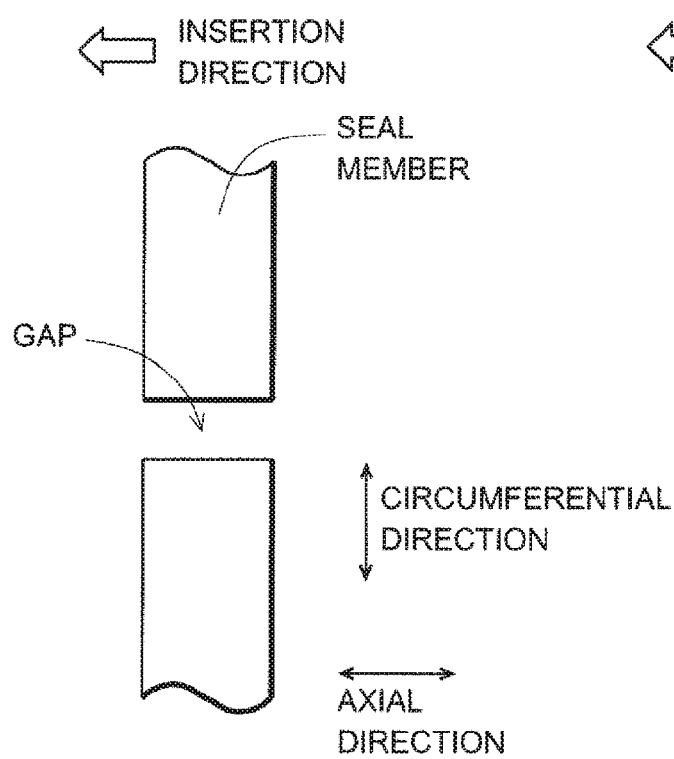
[FIG. 8A] An enlarged view illustrating a state where a conventional seal member is attached.
Figure 8B:
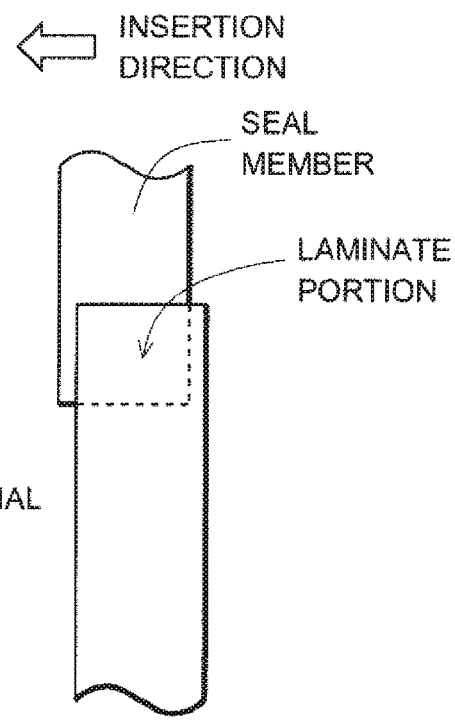
[FIG. 8B] An enlarged view illustrating another state where the conventional seal member is attached.

FIGS. 7A and 7B show another embodiment of the both end portions of the seal member 9. The band-shaped seal member 9 is wound around the pipe portion 71 in a state where both end portions 91c and 92c overlap each other in the circumferential direction and are displaced in the axial direction. Between the both end portions of the seal member 9, a gap D is formed in the axial direction. In a region R where the both end portions 91b and 92b of the seal member 9 overlap each other in the circumferential direction, a non-fixed portion 911c which is extended a length L from the tip end of the end portion 91c on the side of the connection portion and which is not adhered to the pipe portion 71 is formed.

In the seal member 9 configured as described above, when the insertion port of the exhaust fan 7 is inserted into the reception port of the exhaust duct 8, as shown in FIG. 7B, the non-fixed portion 911c of the end portion 91c of the seal member 9 is elastically deformed by a pressing force caused by the inner circumferential surface of the reception port to make contact with the other end portion 92c of the seal member 9 and thereby block the gap D between the both end portions. In this way, as in the embodiment shown in FIGS. 5A and 5B, the hermeticity of the connection portion is acquired. As in the embodiment described above, the non-fixed portion 911c is preferably the whole or part of the region R where the both end portions of the seal member 9 overlap each other in the circumferential direction.

Although the embodiments described above relate to the connection between the pipe portion 71 of the exhaust fan 7 and the duct (pipe member) 8, the structure of the seal member 9 described above can naturally be applied to the connection of the pipe members.

What is claimed is:

1. An image forming apparatus comprising:
   a fan which has a pipe portion serving as an inlet/outlet gas path; and
   a duct to which a plurality of pipe members are connected,
   wherein one of the pipe portion and the pipe member and/or one of the pipe members is inserted and fitted into the other such that the one and the other are connected to each other,
   a band-shaped seal member is attached to an entire outer circumference of the one or an entire inner circumference of the other,
   both end portions of the seal member overlap each other in a circumferential direction of the pipe portion or the pipe member and are located a predetermined gap apart in an axial direction and
   the end portion of the seal member on a side of connection of the pipe portion or the pipe member has a non-fixed portion which is extended a predetermined length from a tip end in the circumferential direction and which is not fixed to the pipe portion or the pipe member.

2. The image forming apparatus according to claim 1,
   wherein in a region where the both end portions of the seal member overlap each other in the circumferential direction of the pipe portion or the pipe member, a tip end portion is narrower in width than a root portion.

3. The image forming apparatus according to claim 2,
   wherein in the region where the both end portions of the seal member overlap each other in the circumferential direction of the pipe portion or the pipe member, the width is narrower toward the tip end either continuously or stepwise.

4. The image forming apparatus according to claim 2,
   wherein the non-fixed portion is a whole or part of the region where the both end portions of the seal member overlap each other in the circumferential direction.

5. The image forming apparatus according to claim 1,
   wherein the length of the non-fixed portion from the tip end is longer than the gap between the both end portions of the seal member in the axial direction.

* * * * *